(12) United States Patent
Liao

(10) Patent No.: US 8,596,669 B2
(45) Date of Patent: Dec. 3, 2013

(54) BABY STROLLER

(75) Inventor: Gordon Liao, Tainan (TW)

(73) Assignee: Unique Product & Design Co., Ltd., Tainan (TW)

( * ) Notice: Subject to any disclaimer, the term of this patent is extended or adjusted under 35 U.S.C. 154(b) by 0 days.

(21) Appl. No.: 13/290,189

(22) Filed: Nov. 7, 2011

(65) Prior Publication Data

US 2013/0113188 A1     May 9, 2013

(51) Int. Cl.
    *B62B 7/06*         (2006.01)

(52) U.S. Cl.
    USPC ........ 280/647; 280/47.38; 280/639; 280/650; 403/113

(58) Field of Classification Search
    USPC ........ 280/47.38, 47.39, 647, 650; 403/11–13, 403/23, 85, 92, 94, 96, 112, 113, 93
    See application file for complete search history.

(56) References Cited

U.S. PATENT DOCUMENTS

| | | | |
|---|---|---|---|
| 6,422,586 B1 * | 7/2002 | Glover | 280/647 |
| 7,401,803 B1 * | 7/2008 | Lai | 280/647 |
| 7,441,794 B2 | 10/2008 | Lan | |
| 7,632,035 B2 * | 12/2009 | Cheng | 403/98 |
| 7,766,366 B2 * | 8/2010 | Li | 280/642 |
| 2007/0096438 A1 * | 5/2007 | Valdez et al. | 280/652 |
| 2010/0025968 A1 * | 2/2010 | Fritz et al. | 280/647 |
| 2010/0078916 A1 * | 4/2010 | Chen | 280/648 |

FOREIGN PATENT DOCUMENTS

| | | |
|---|---|---|
| EP | 2 363 334 B1 | 3/2012 |
| GB | 2 449 892 A | 12/2008 |
| WO | WO 2010091513 A1 * | 8/2010 |

* cited by examiner

*Primary Examiner* — John R Olszewski
*Assistant Examiner* — Steve Clemmons
(74) *Attorney, Agent, or Firm* — Alan Kamrath; Kamrath IP Lawfirm, P.A.

(57) ABSTRACT

A baby stroller is formed by a stroller frame and a chair, and the stroller frame includes a rotatable base. When the baby stroller is unfolded, the base is provided for abutting the stroller frame and positioned automatically, and when the baby stroller is folded, the chair and the stroller frame are folded and positioned directly together with the rotation of the base. The chair includes a folding joint, such that the chair can be folded directly onto the stroller frame to provide a simple, easy and quick operation and to achieve the effect of reducing the storage volume of the baby stroller.

16 Claims, 26 Drawing Sheets

BABY STROLLER

BACKGROUND OF THE INVENTION

1. Field of the Invention

The present invention relates to a baby stroller and, more particularly, to the baby stroller that can be folded together with a chair directly to provide a simple, easy and quick operation, and with the chair folded while connected to a stroller frame directly to reduce the storage volume of the baby stroller.

2. Description of the Related Art

With reference to FIGS. 1 to 4 for a conventional baby stroller, the baby stroller comprises a stroller frame having an independent seat base 1 and a baby seat 10 capable of being sheathed and mounted on the seat base and capable of changing a direction of the seat 10 simply and quickly. However, the seat 10 is protruded from the stroller frame. Thus, when the baby stroller is folded, the size (which refers to the folding volume) is too large (or too high) as shown in FIG. 4, and the too-large size or volume causes inconvenience to the transportation or carrying of the baby stroller. If the seat 10 faces backward (as shown in FIG. 3), the seat 10 will interfere with the stroller frame during the folding process. Thus, the baby stroller cannot be folded directly. When the seat is facing backward, it is necessary to remove the seat 10 before folding the baby stroller. Obviously, such operation not only involves a complicated procedure, but also requires separating the stroller frame and the seat 10 before folding the baby stroller, so that parts may be lost or missing easily and so that the transportation and carrying of the baby stroller becomes inconvenient.

SUMMARY OF THE INVENTION

Therefore, it is a primary objective of the present invention to provide a baby stroller that can be folded with a chair still attached to provide a simple, easy and quick operation.

Another objective of the present invention is to provide a chair that can be folded while connected to a stroller frame directly to reduce the storage volume of the baby stroller.

To achieve the foregoing objectives, the present invention provides a baby stroller comprising an independent stroller frame and a chair. The stroller frame comprises a rotatable base. When the baby stroller is unfolded, the rotatable base abutting the stroller frame automatically positions a seat latch. When the baby stroller is folded, the chair may rotate together with the rotatable base. Thus, the chair can be folded and positioned together with the stroller frame directly.

In addition, the chair of the present invention includes a folding joint. Thus, the chair can be folded while connected to the stroller frame directly to provide a simple, easy and quick operation and to achieve the effect of reducing the storage volume of the baby stroller.

DETAILED DESCRIPTION OF THE PREFERRED EMBODIMENTS

Figure 1:
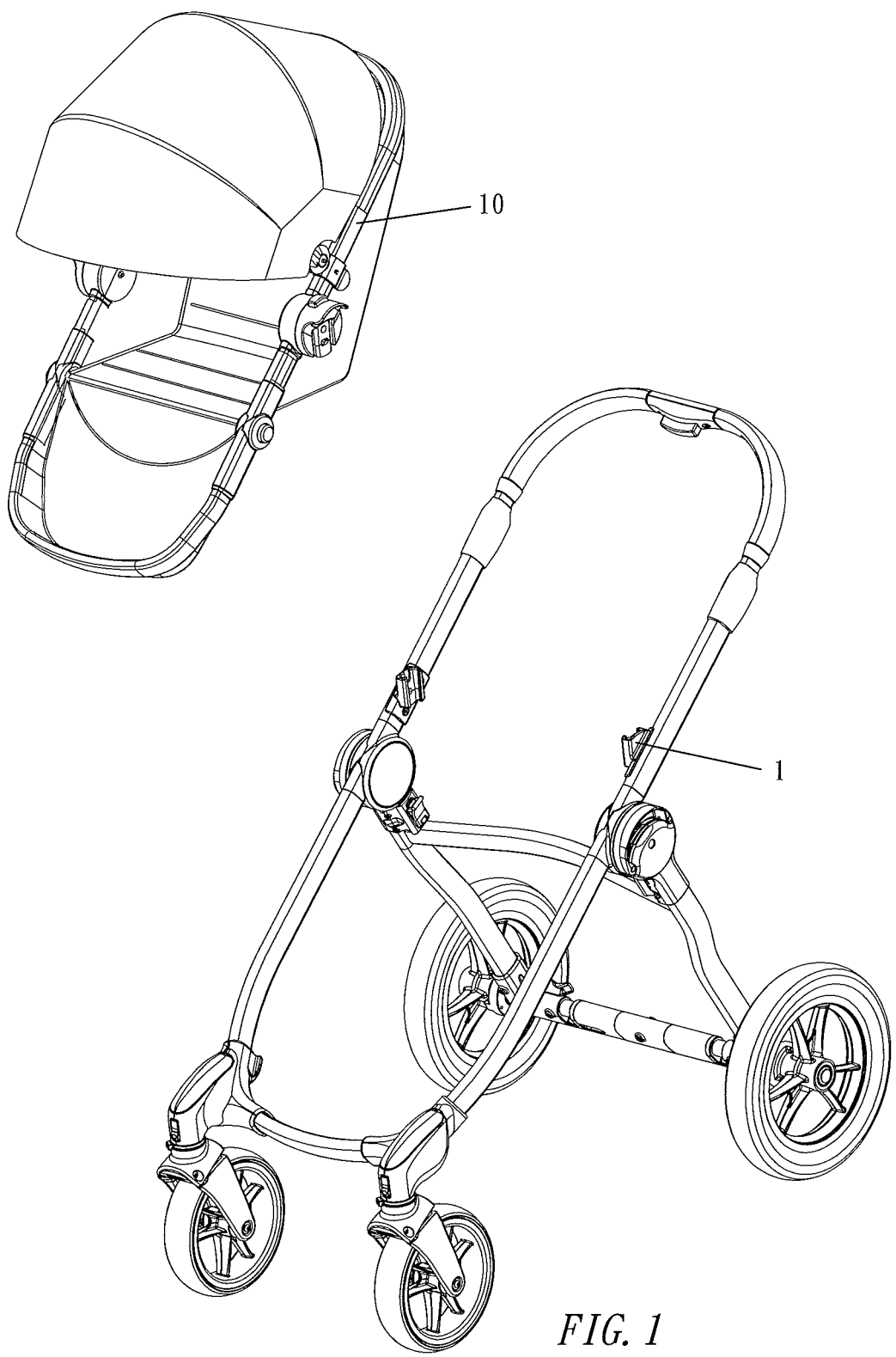
FIG. 1 is a perspective view of disassembled parts of a conventional baby stroller.
Figure 2:
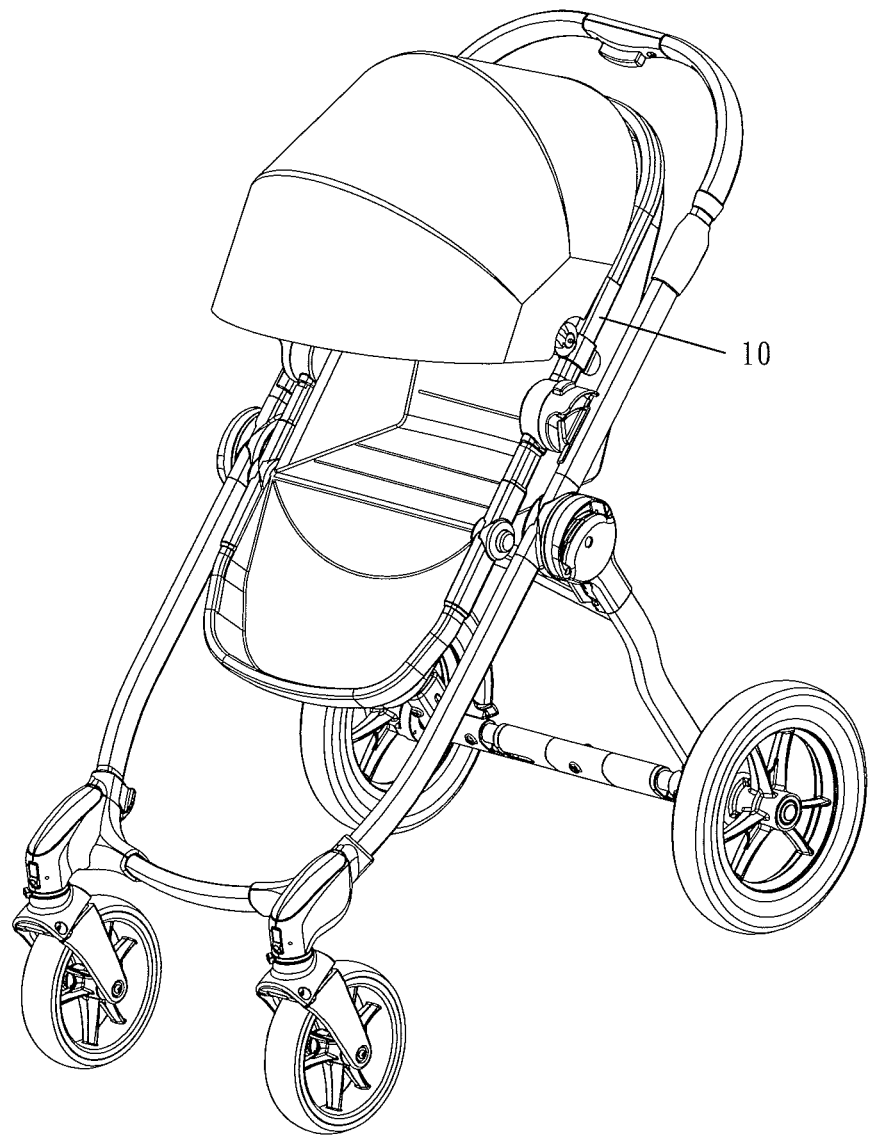
FIG. 2 is a perspective view of a conventional baby stroller.
Figure 3:
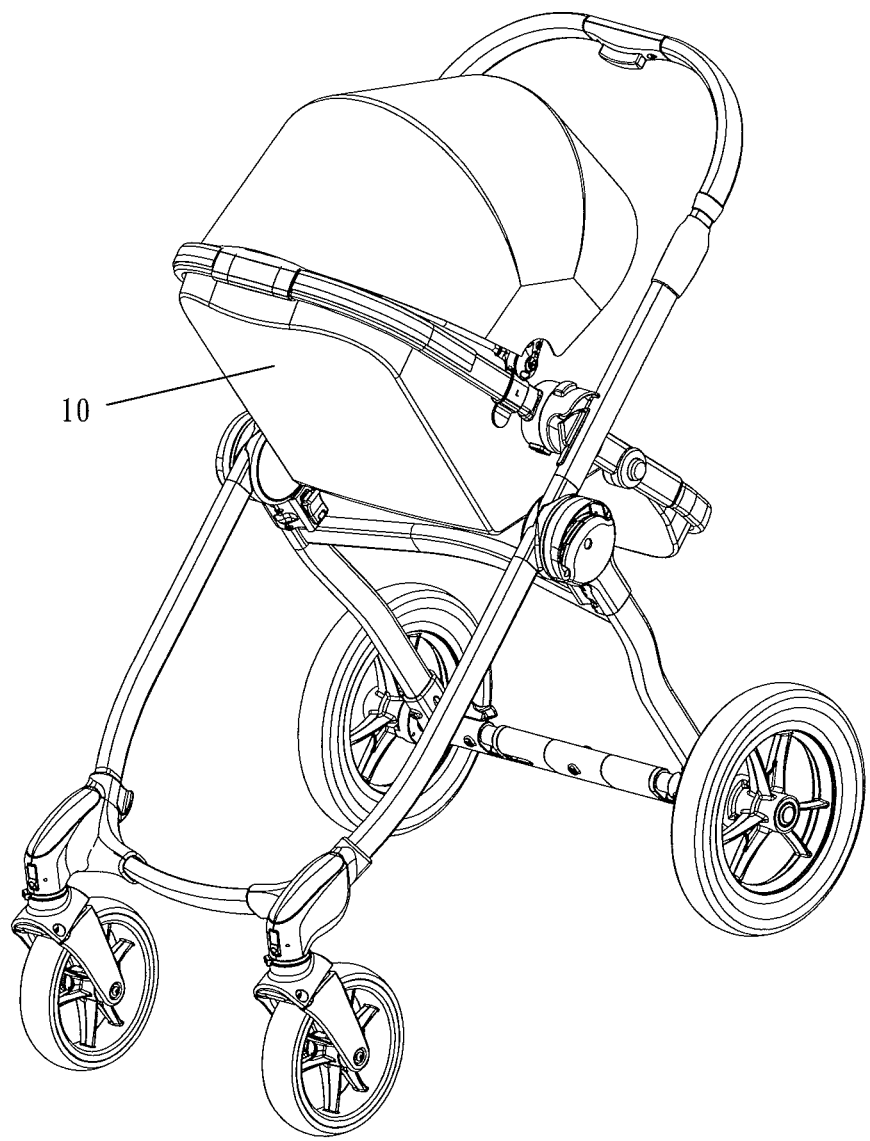
FIG. 3 is another perspective view of a conventional baby stroller.
Figure 4:
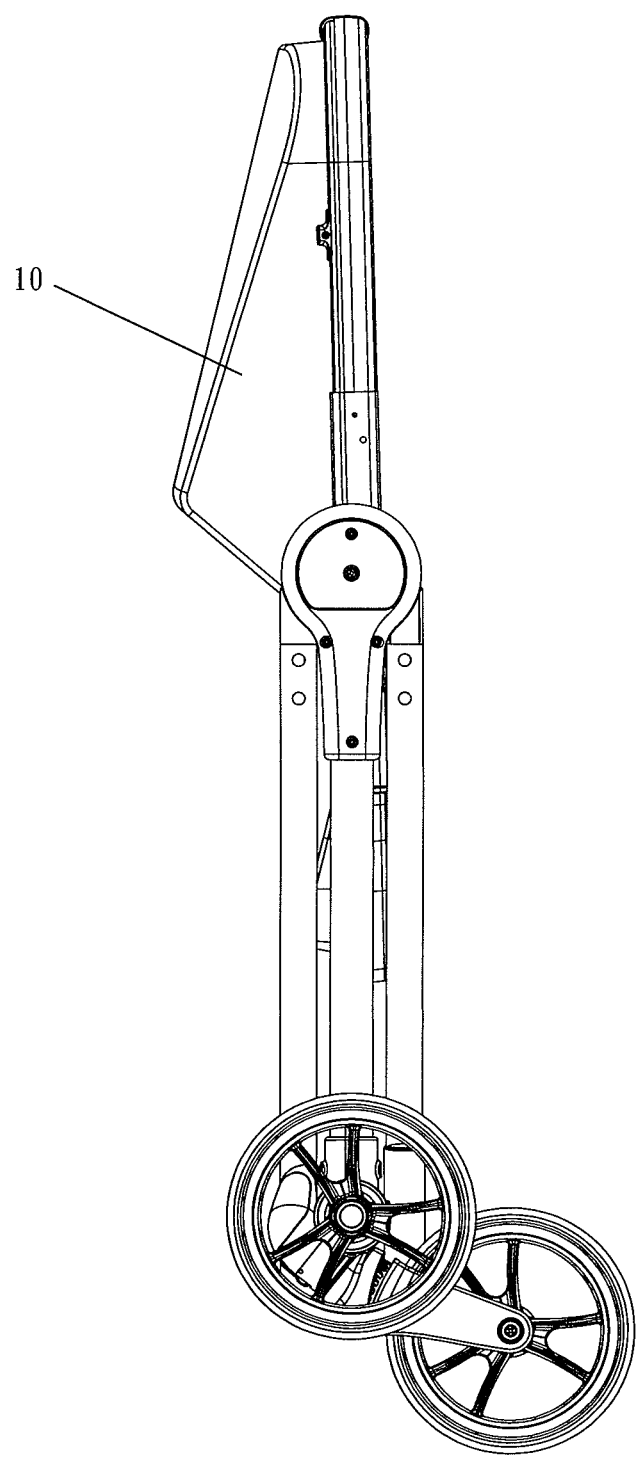
FIG. 4 is a side view of folding a conventional baby stroller.
Figure 5:
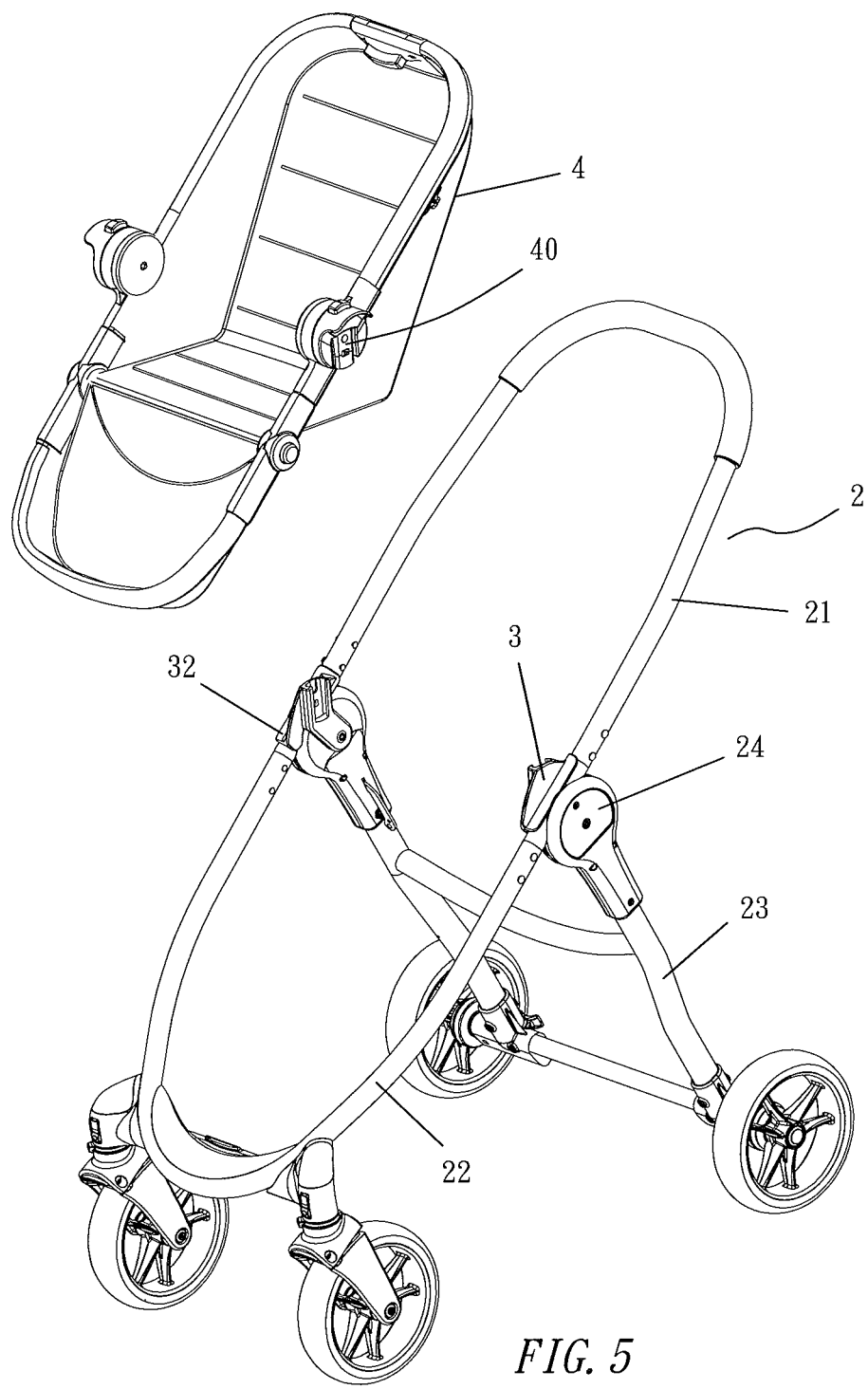
FIG. 5 is a perspective view of dissembled parts of the present invention.
Figure 6:
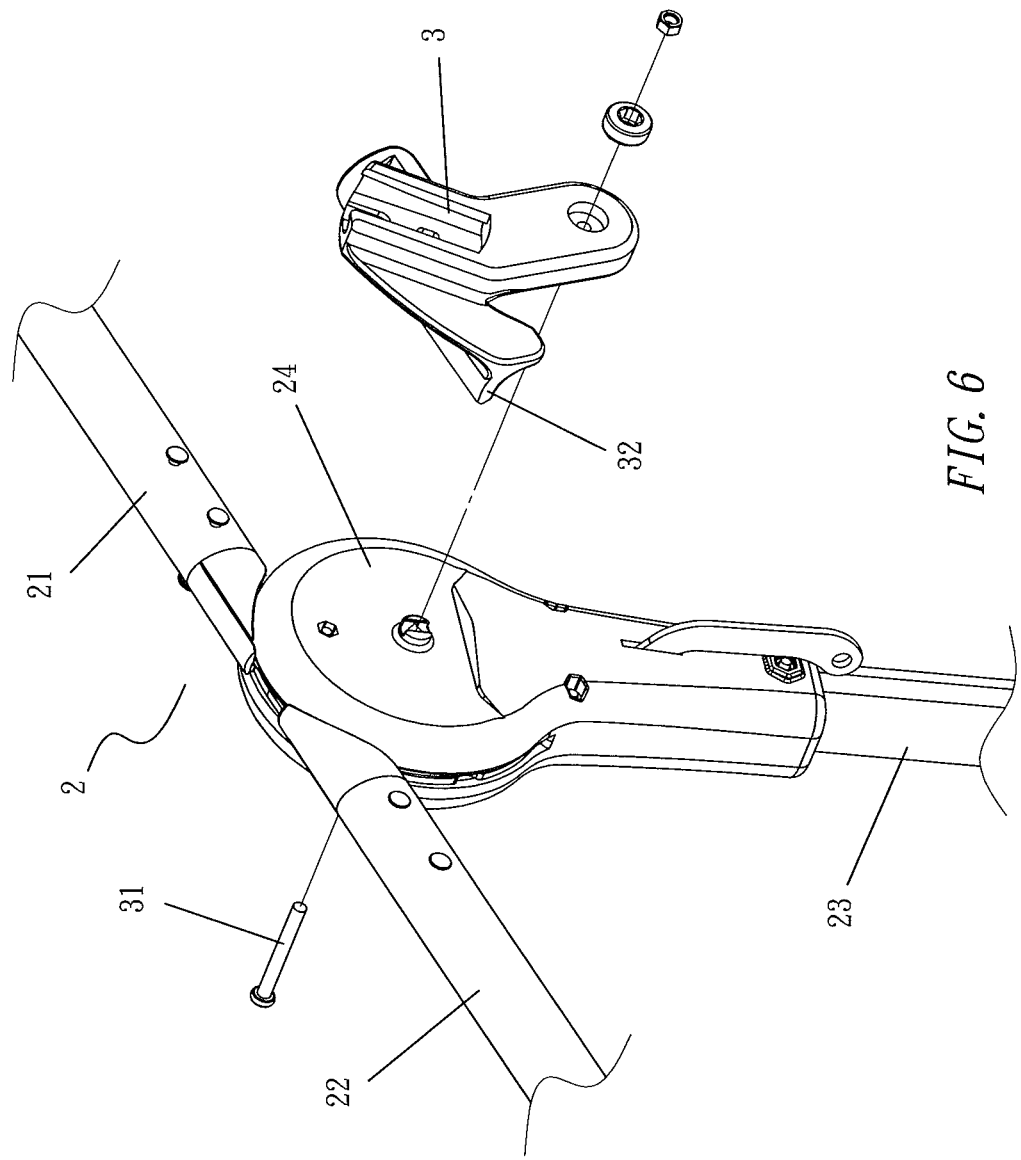
FIG. 6 is an exploded view of a positioning element of the present invention.

The technical characteristics, structures and effects of the present invention will become apparent with the detailed description of two preferred embodiments together with the illustration of related drawings as follows.

With reference to FIGS. 5 to 8, the baby stroller of the present invention comprises an independent stroller frame 2 having upper and lower tubes 21, 22, a rear wheel frame 23 and a joint 24. A rotatable base 3 is fixed to the stroller frame 2 (or the joint 24) by a fixing element 31 (such as a bolt), and is freely rotatable. The rotatable base 3 has a positioning element 32 installed on an external side at an upper end of the base 3. The positioning element 32 can be a semicircular arc shaped stop block. An independent chair 4 has a seat latch 40 capable of being latched to the base 3 to mount the chair 4 onto the stroller frame 2.

Figure 7:
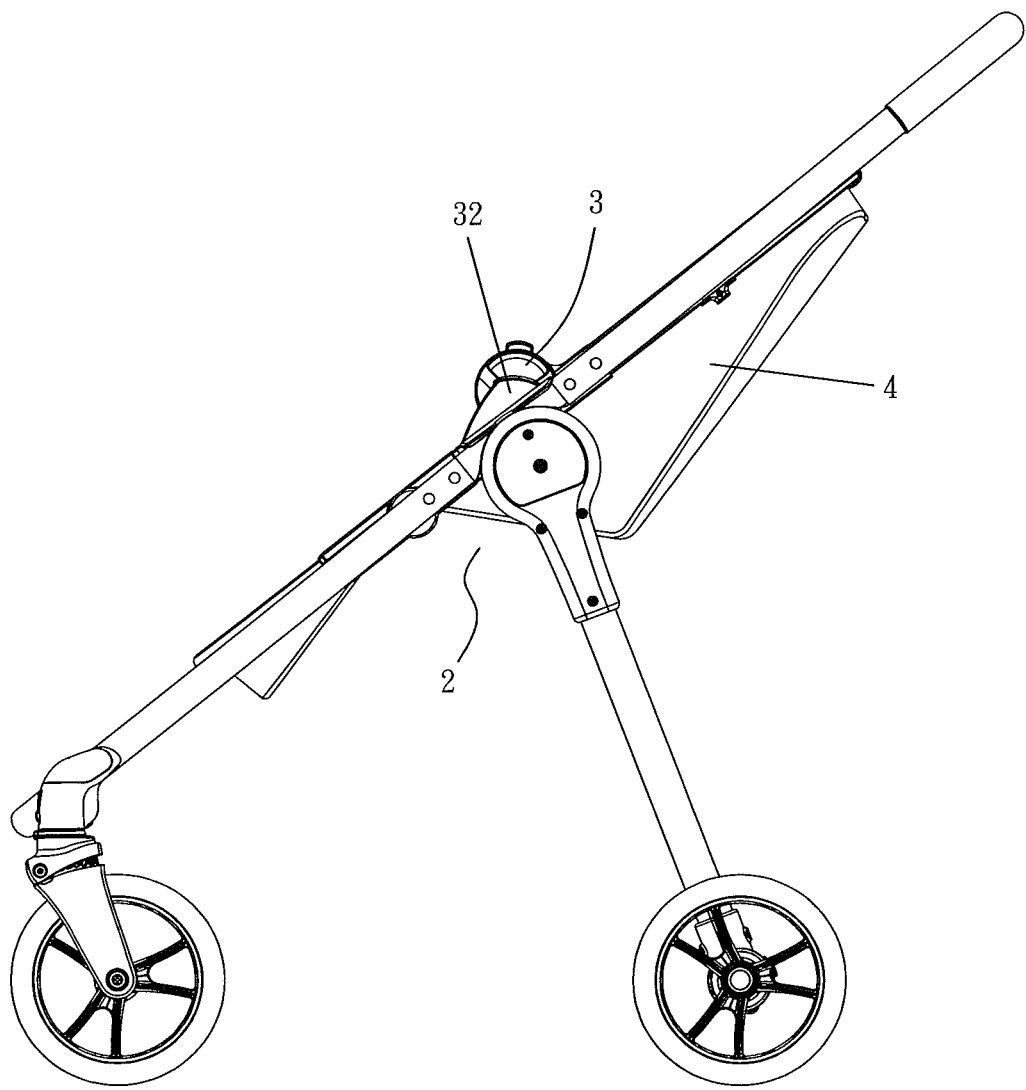
FIG. 7 is a side view of unfolding a baby stroller of the present invention.
Figure 8:
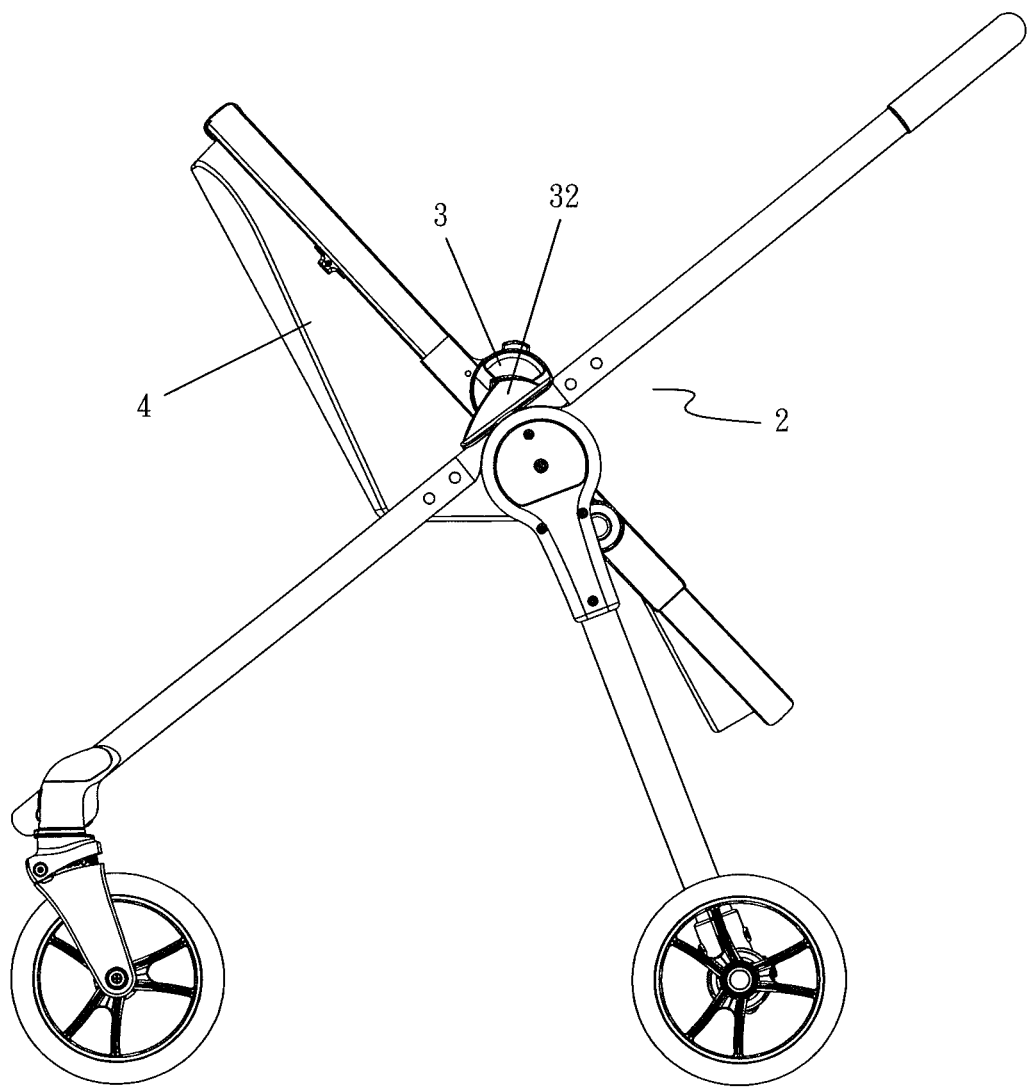
FIG. 8 is another side view of unfolding a baby stroller of the present invention.
Figure 9:
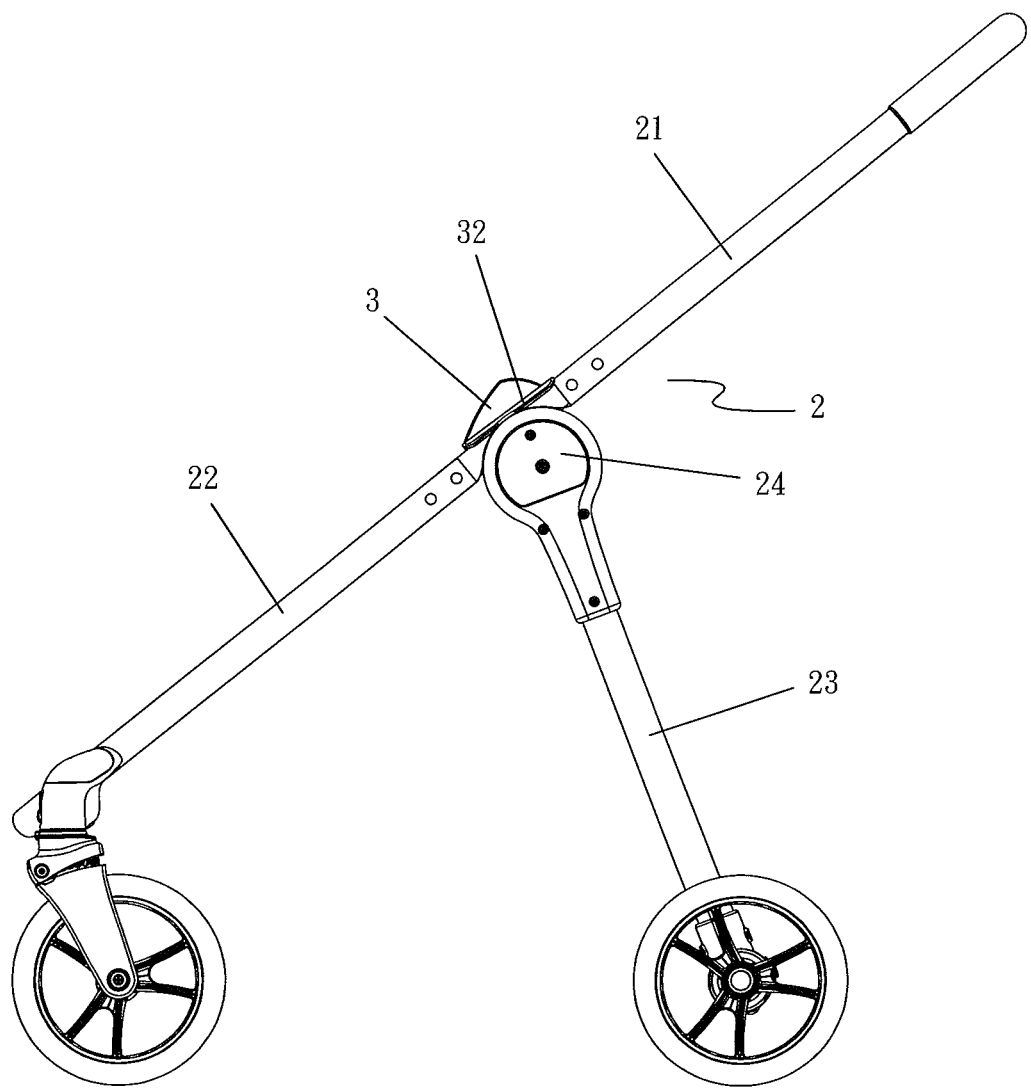
FIG. 9 is a side view of a stroller frame when unfolding a baby stroller of the present invention.
Figure 10:
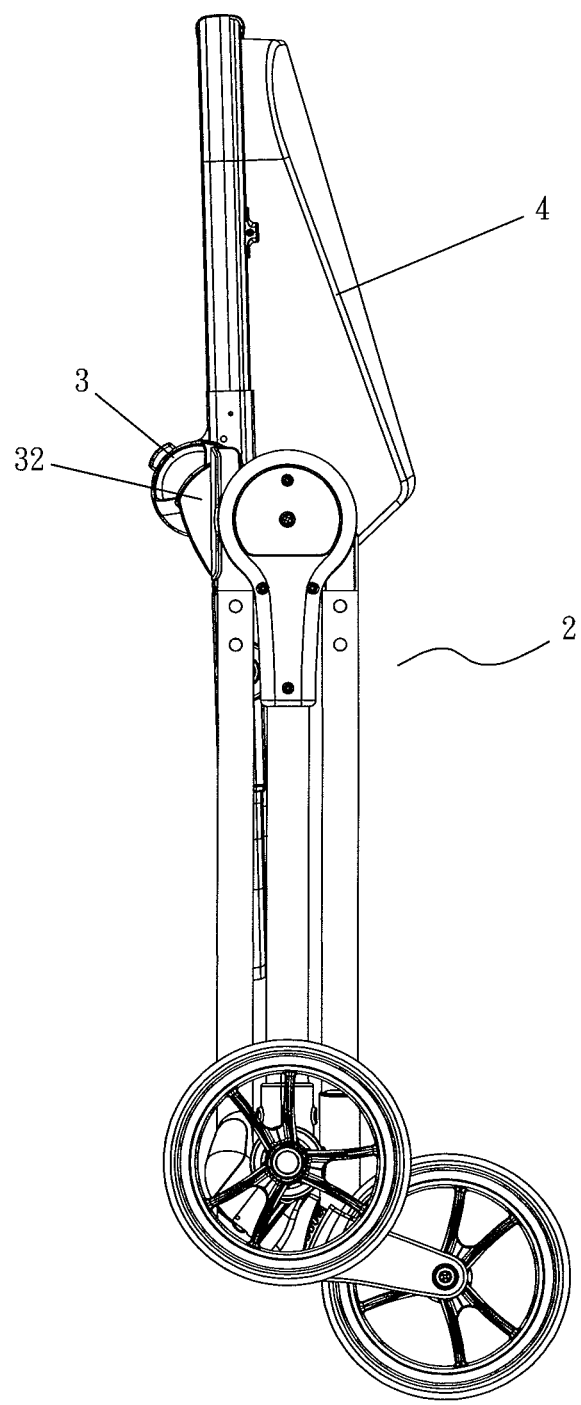
FIG. 10 is a side view of folding a baby stroller of the present invention.
Figure 11:
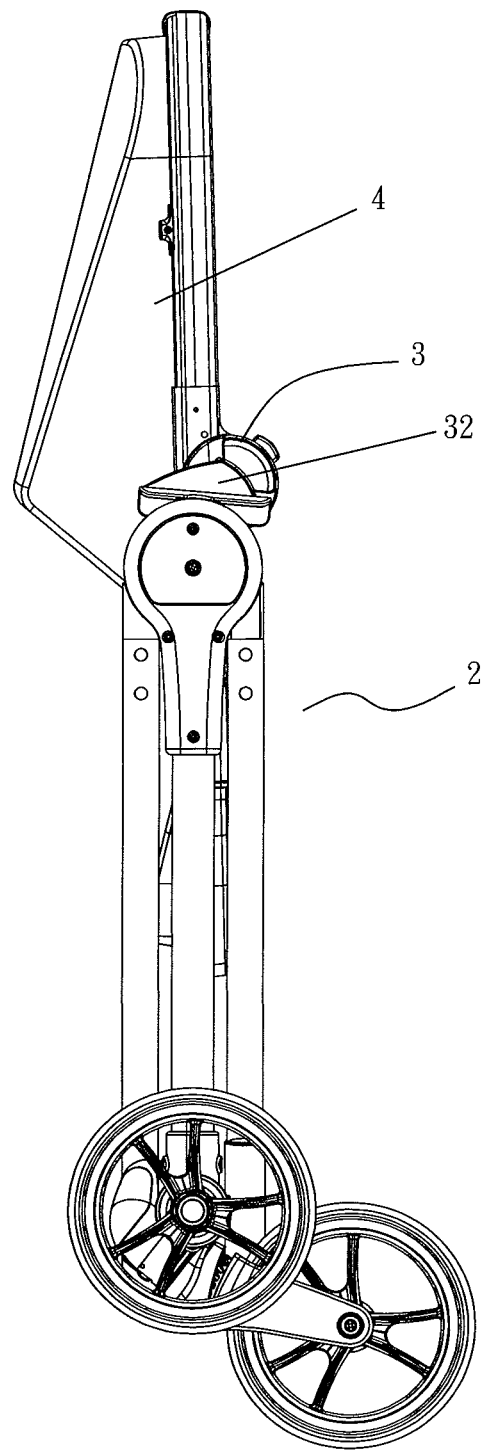
FIG. 11 is another side view of folding a baby stroller of the present invention.
Figure 12:
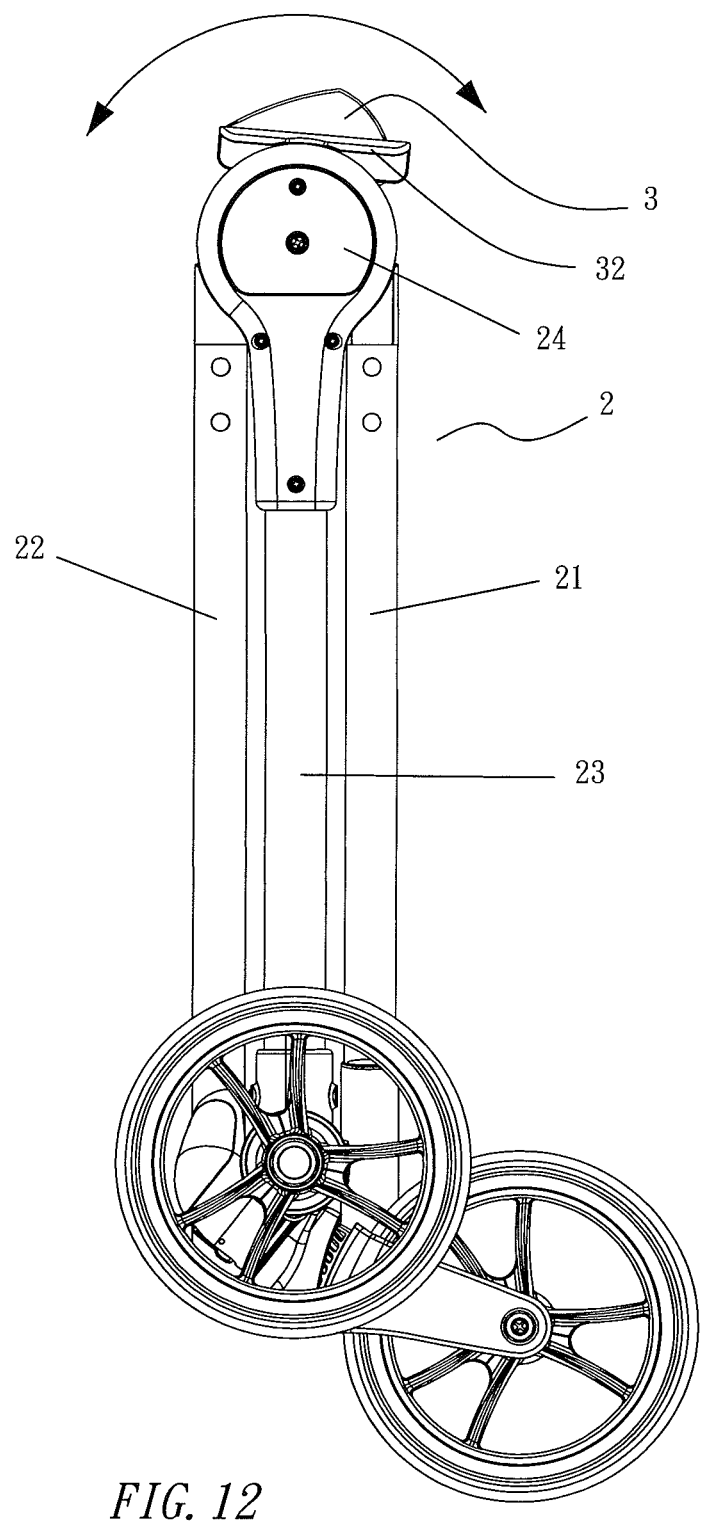
FIG. 12 is a side view of a stroller frame when folding a baby stroller of the present invention.

When the baby stroller is unfolded, the positioning element 32 of the rotatable base 3 abuts and fixes the stroller frame 2 as shown in FIGS. 7 to 9. On the other hand, if a user wants to fold the baby stroller, the user simply turns the stroller frame 2 downwardly and inwardly to fold and fix the stroller frame 2 together with the chair 4 by the rotatable feature of the rotatable base 3, without removing the chair 4 as shown in FIGS. 10 and 11. Of course, the user can selectively remove the chair 4 first and then fold the stroller frame 2 as shown in FIGS. 9 and 12.

In short, the present invention installs a rotatable base 3 on the stroller frame 2. Thus, when the baby stroller is unfolded, the base 3 abuts the stroller frame 2 to position the stroller frame 2 automatically. When the baby stroller is folded, the freely rotatable feature of the rotatable base 3 can be used to fold and position the chair 4 together with the stroller frame 2 directly.

From the description above, the present invention has one or more of the following advantages and effects, and obviously improves over the prior art.

1. The direction of the chair 4 can be changed simply and quickly.

2. The chair 4 can be folded onto the stroller frame 2 directly, not only overcoming the problem of the conventional baby stroller that cannot be folded without removing the seat, but also simplifying the procedure of folding the baby stroller and providing a simple, easy and quick operation.

3. The chair 4 can be folded while connected to the stroller frame 2 directly to avoid separating the chair 4 and the stroller frame 2 or to prevent missing components.

Figure 13:
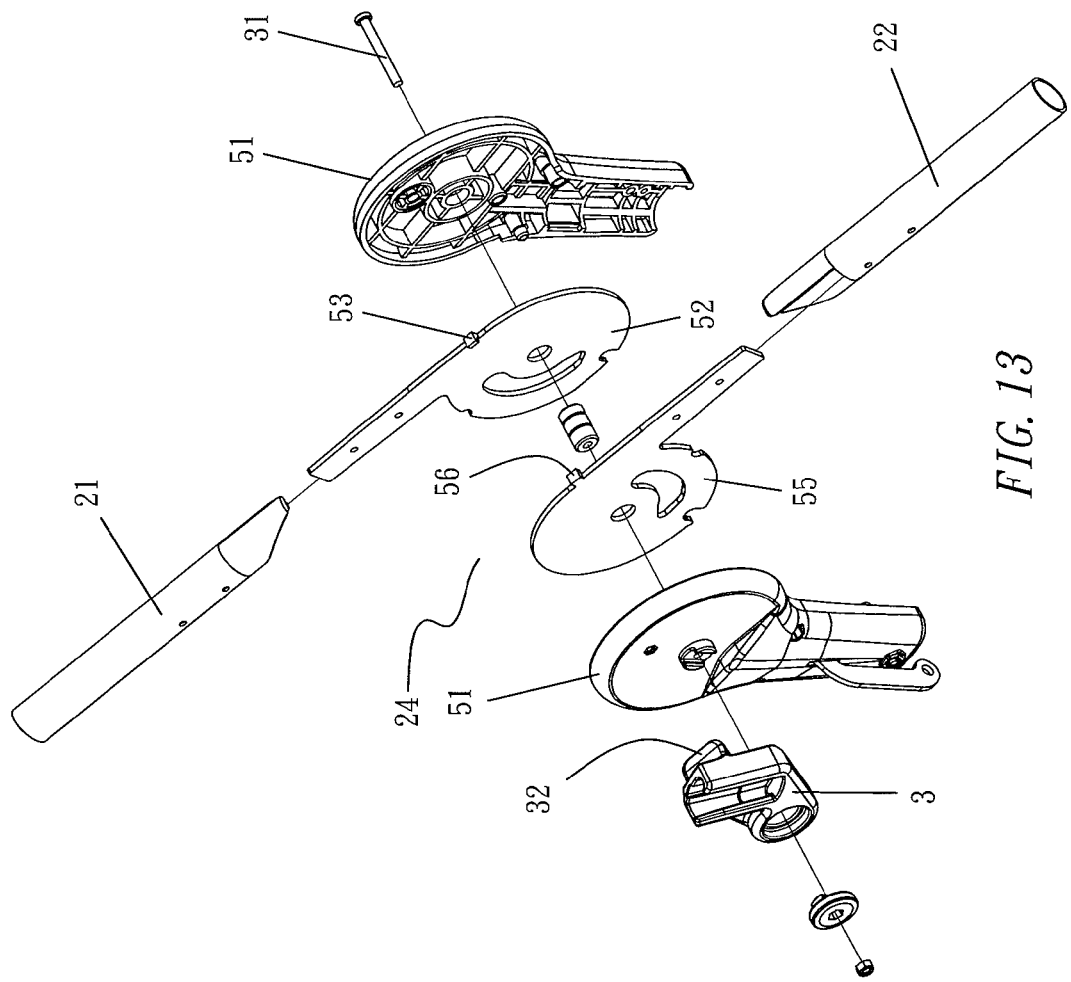
FIG. 13 is an exploded view of a positioning element in accordance with another preferred embodiment of the present invention.
Figure 14:
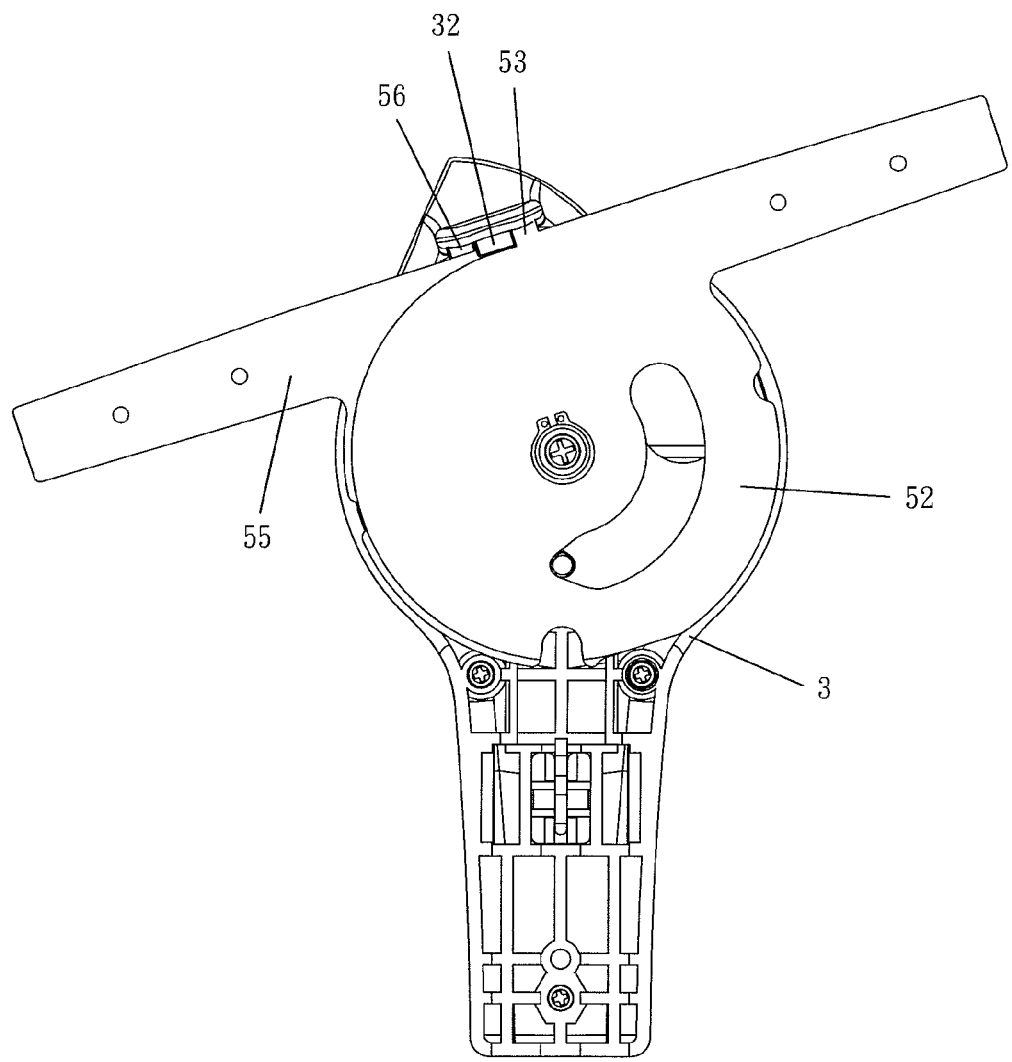
FIG. 14 is a schematic view of a positioning element when unfolding a baby stroller in accordance with another preferred embodiment of the present invention.
Figure 15:
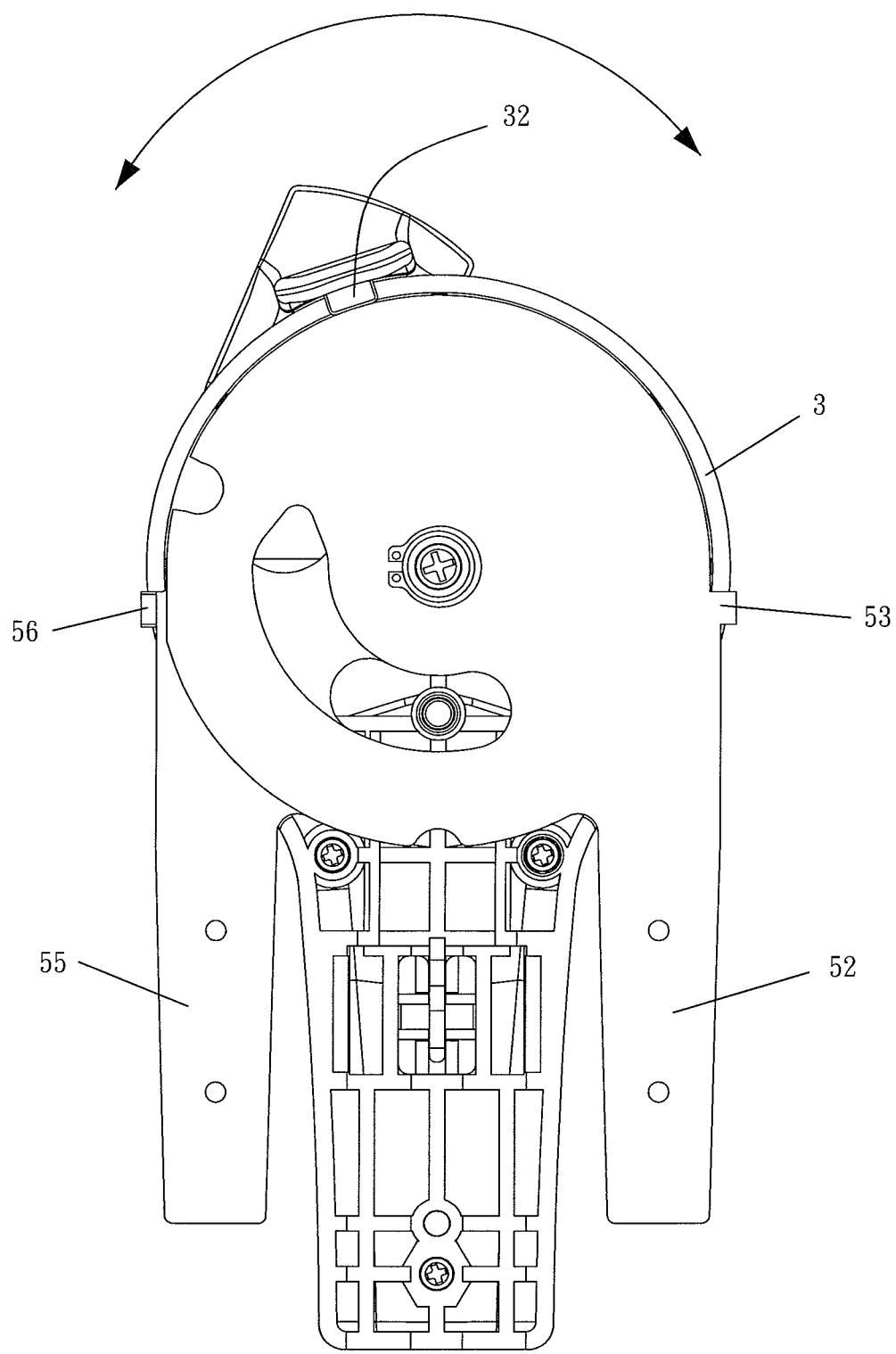
FIG. 15 is a schematic view of a positioning element when folding a baby stroller in accordance with another preferred embodiment of the present invention.

With reference to FIGS. 13 to 15, a joint 24 of the present invention comprises two joint covers 51 secured by a fixing element 31 and fixed to the base 3. An upper link plate 52 is installed in the joint cover 51 and coupled to the upper tube 21. The upper link plate 52 has a bump 53. A lower link plate 55 is installed in the joint cover 51 and coupled to the lower tube 22. The lower link plate 55 has a stop body 56 corresponding to the upper link plate 52.

When the baby stroller is unfolded, the positioning element 32 of the base 3 stops the bump 53 and the stop body 56 of the upper and lower link plates 52, 55. Thus, when the stroller frame 2 (which includes the upper and lower tubes 21, 22) is unfolded, the stroller frame 2 can be positioned automatically as shown in FIG. 14. On the other hand, if the user wants to unfold the baby stroller, the user simply turns the stroller frame 2 downwardly and inwardly, so that the upper and lower link plates 52, 55 are rotated to obtain the folding and positioning effects as shown in FIG. 15, to achieve the same effect of the foregoing preferred embodiment.

Figure 16:
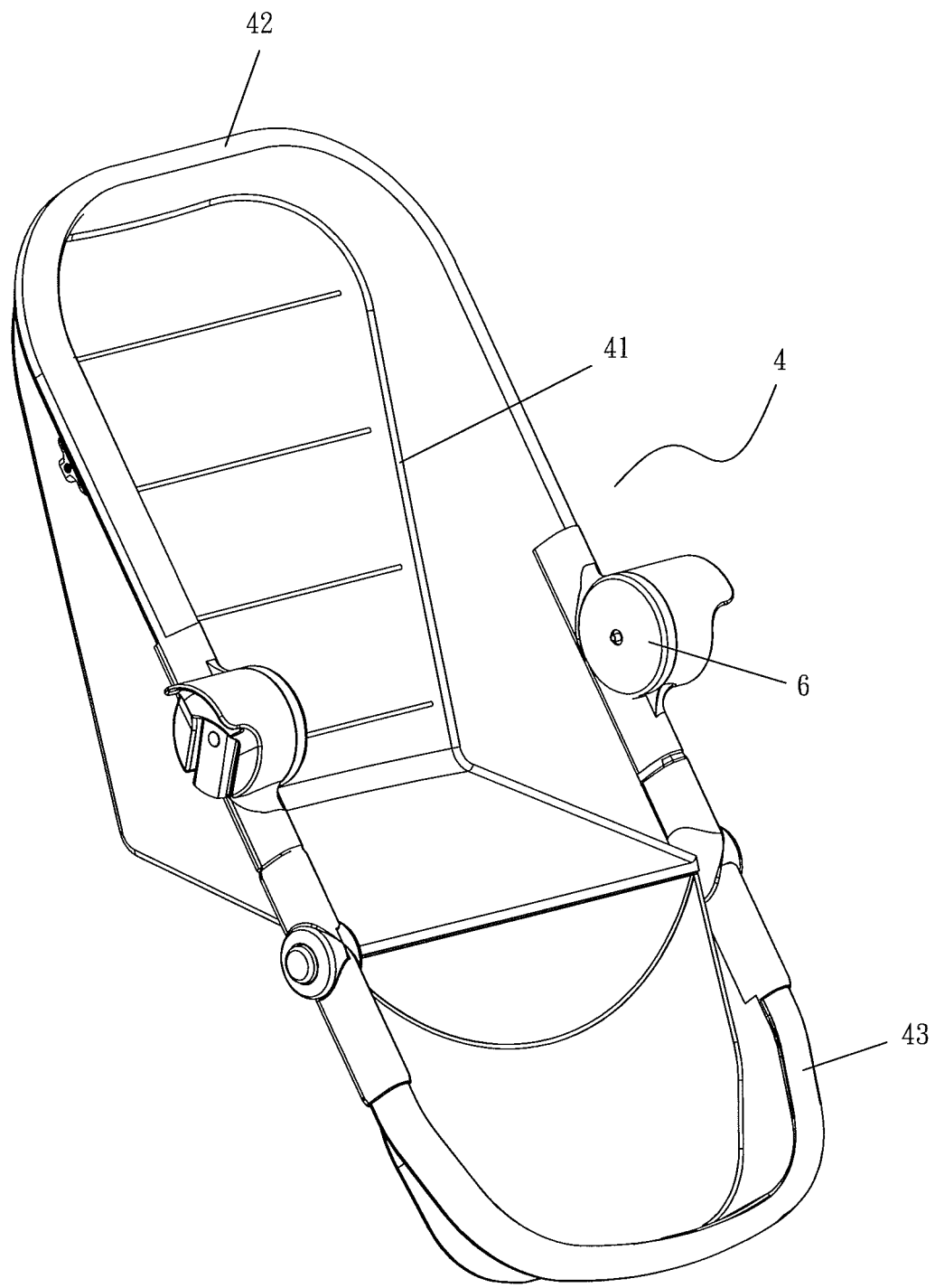
FIG. 16 is a perspective view of a chair of the present invention.
Figure 17:
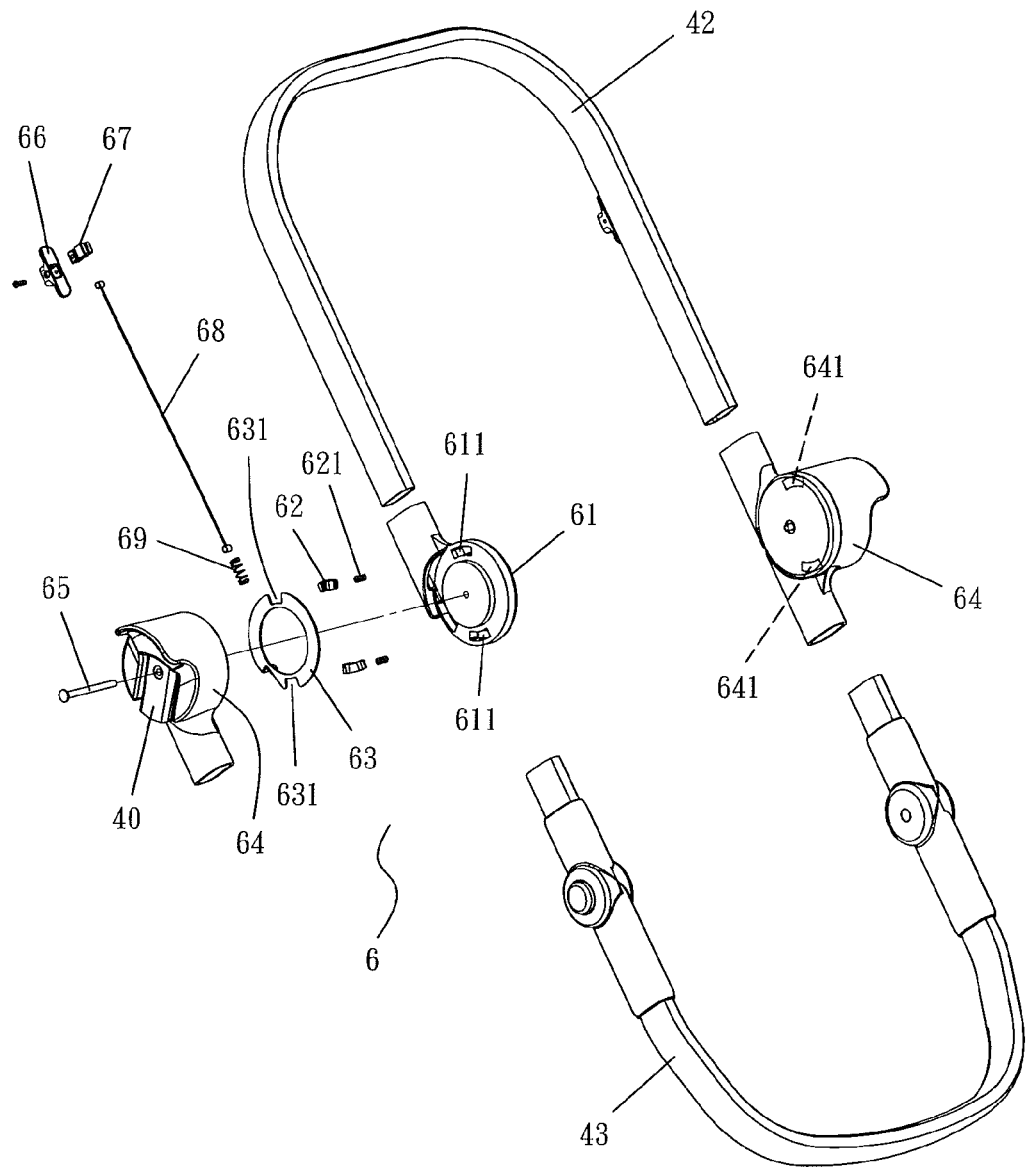
FIG. 17 is an exploded view of a chair folding joint of the present invention.
Figure 18:
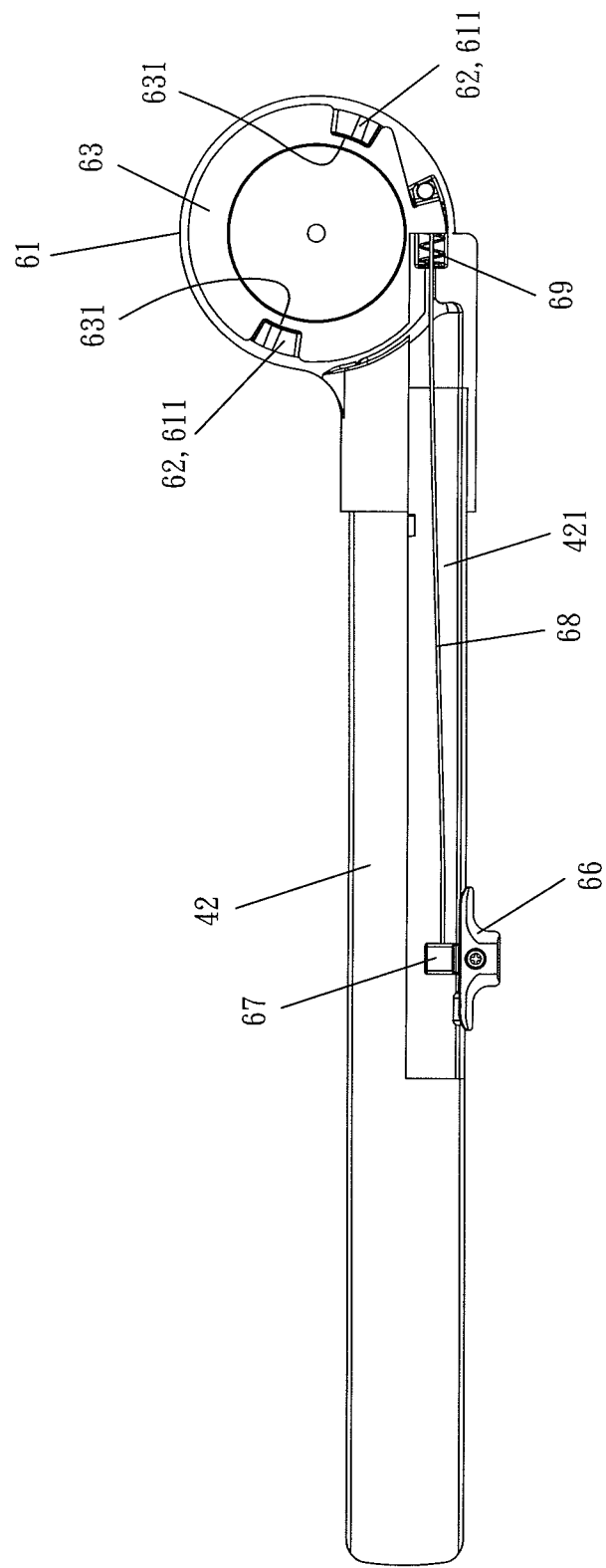
FIG. 18 is a schematic view of a chair folding joint in a locked state in accordance with the present invention.
Figure 19:
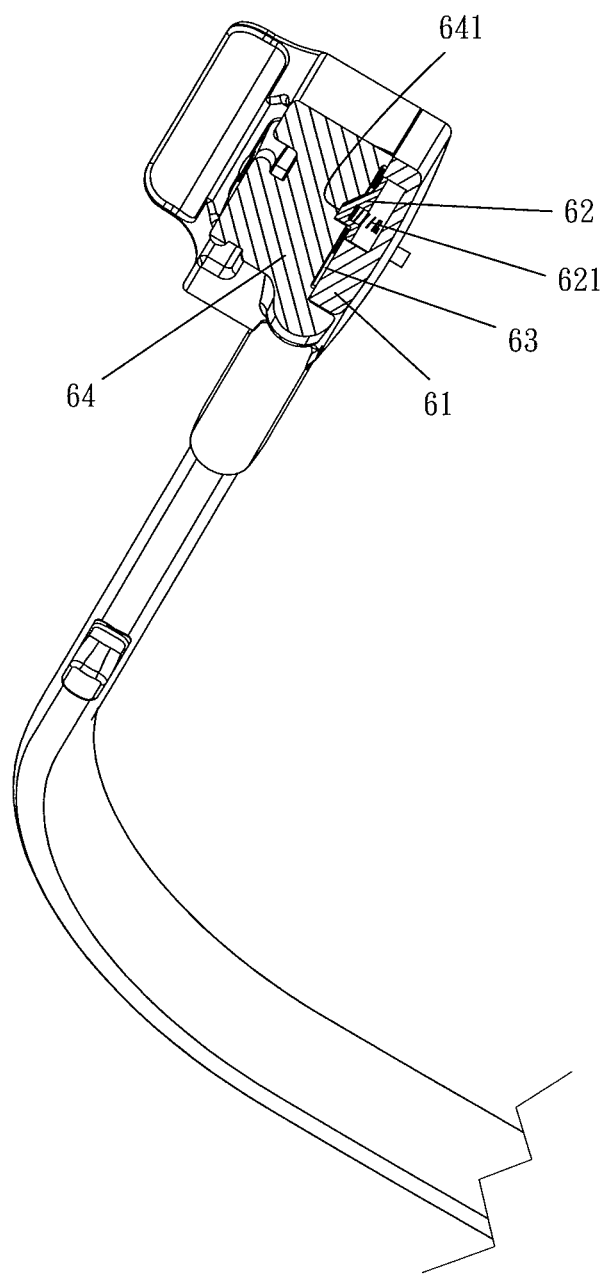
FIG. 19 is another schematic view of a chair folding joint in a locked state in accordance with the present invention.

To further reduce the storage volume when folding the baby stroller, the present invention further comprises a folding joint 6 installed onto the chair 4 as shown in FIGS. 16 and 17. The chair 4 comprises a fabric seat 41 and upper and lower tubes 42, 43 mounted onto the seat 41. The folding joint 6 is installed between the upper and lower tubes 42, 43 of the chair 4. The folding joint 6 includes an upper joint 61 fixed to the bottom of the upper tube 42 of the chair 4 and having a notch 611 formed on an external side of the upper joint 61. Two fixing members 62 are installed in a notch 611 through a spring 621, so that the fixing member 62 is always maintained at an upwardly disposed state. A press plate 63 is installed on an external side of the upper joint 61 and has a breach 631 corresponding to the fixing member 62. A lower joint 64 is fixed at an upper end of the lower tube 43 of the chair 4 and integrated with a seat latch 40. The lower joint has a corresponding positioning slot 641 formed on an internal side of the lower joint 64 (as shown in FIG. 18) and corresponding to the two fixing members 62. The upper and lower joints 61, 64 and a fixing element 65 (such as a rivet) are provided for a fixing effect to position the fixing members 62 and press plate 63 therein. A press button 66 is installed outside the upper tube 42 of the chair 4 and has a slide member 67 coupled to the bottom of the press button 66 and disposed in a slide slot 421 of the upper tube 42 of the chair 4 (as shown in FIG. 19). A link element 68 (such as a steel wire) is installed in the upper tube 42 of the chair 4 and has an end fixed to the press plate 63 and a spring 69 sheathed thereon and another end fixed to the slide member 67.

Figure 20:
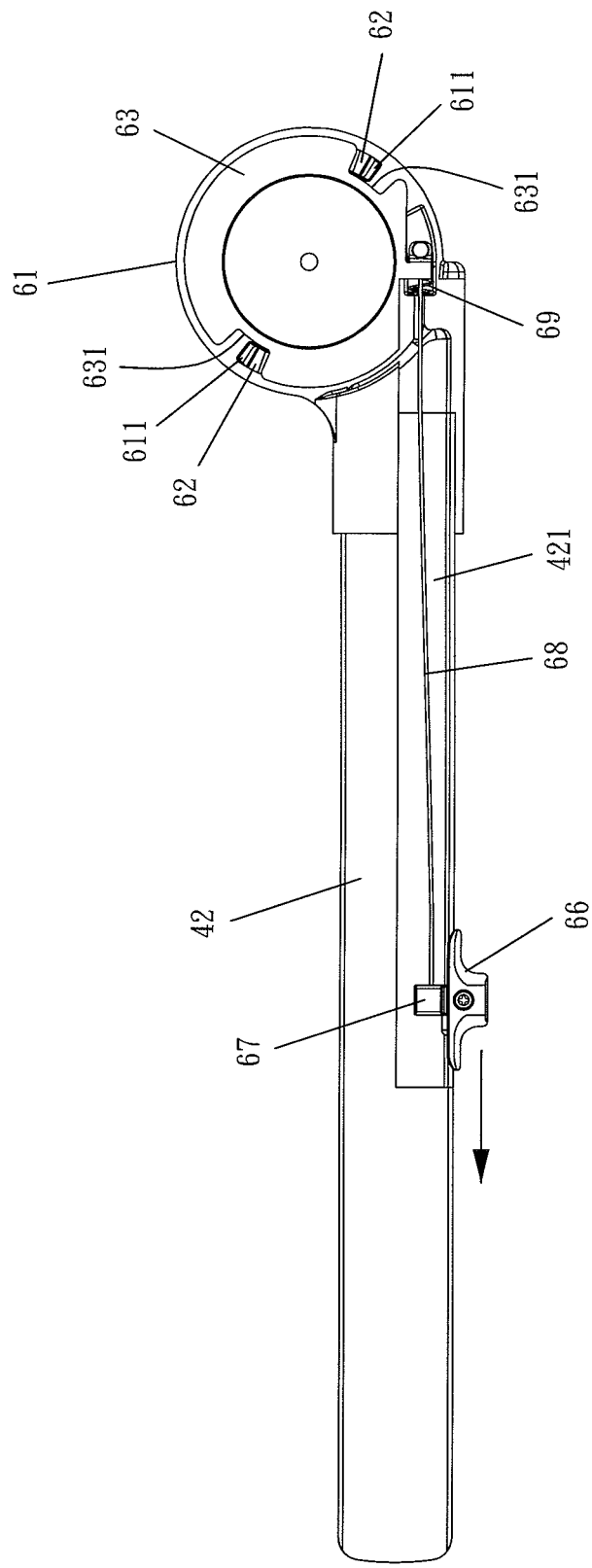
FIG. 20 is a schematic view of a chair folding joint in an unlocked state in accordance with the present invention.
Figure 21:
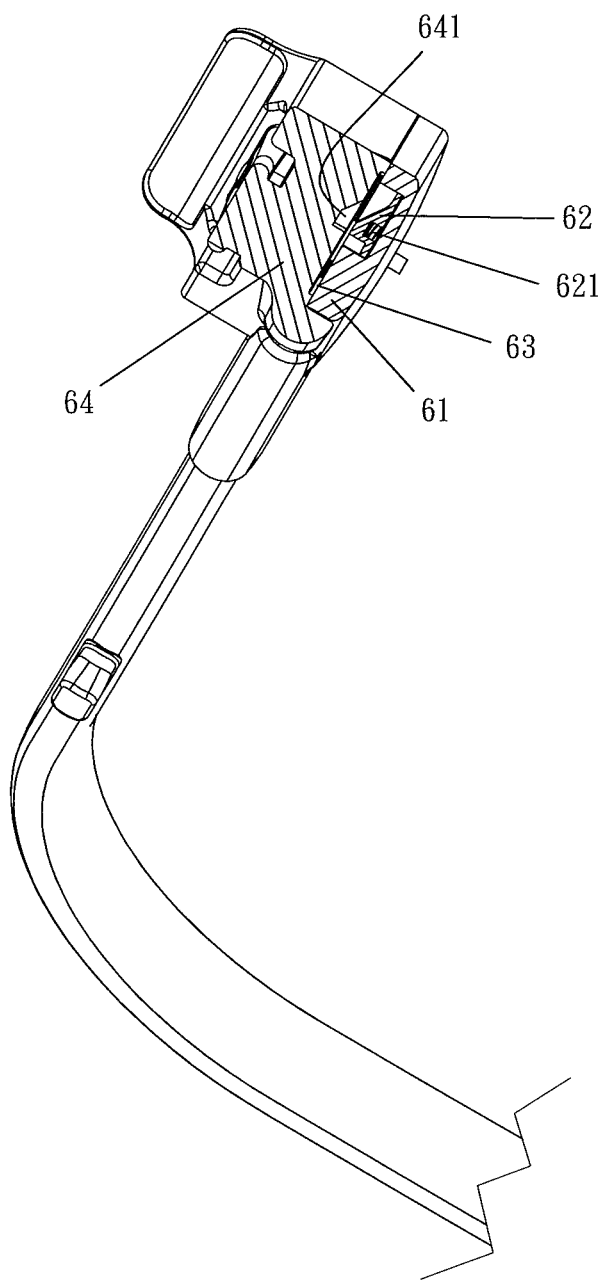
FIG. 21 is another schematic view of a chair folding joint in an unlocked state in accordance with the present invention.
Figure 22:
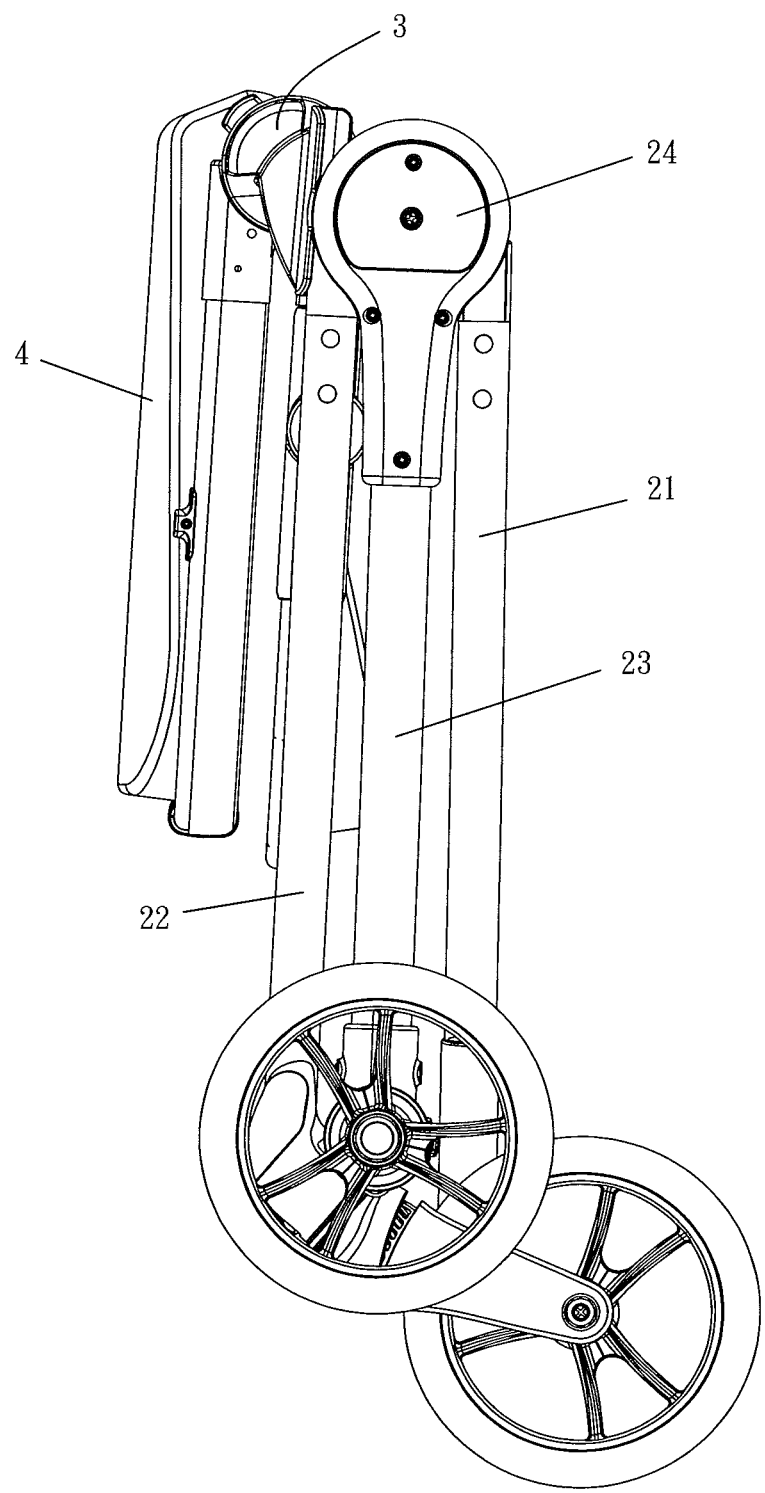
FIG. 22 is a side view of a chair when folding a baby stroller in accordance with the present invention.

With the aforementioned structure, when the chair 4 is unfolded as shown in FIG. 16, the fixing member 62 is latched to the slot 641 of the lower joint 64 as shown in FIGS. 16, 18 and 19. If the user wants to fold the chair 4, the user simply presses the press button 66 and rotates the press plate 63 through the slide member 67 and the link element 68. While the press plate 63 is rotating, the press plate 63 pushes an oblique surface on a side of the fixing member 62 to move the fixing member 62 downward and separate it from the slot 641 of the lower joint 64. Now, the user turns the upper tube 42 of the chair 4 downward, while turning the upper joint 61 to fold the chair 4 as shown in FIGS. 20 to 22. Thus, the baby stroller can be folded and stored directly without removing the chair 4, to reduce the length (or height) of the baby stroller into half.

The chair 4 includes left and right folding joints 6 that can be operated independently, so that users must operate both folding joints 6 at the same time for the operation to prevent a misuse by accident.

If the user does not apply forces to the press button 66, the fixing member 62 and the press plate 63 are rotated back to their original positions by the tension released from the spring 621. Now, the upper tube 42 of the chair 4 is lifted and unfolded, and the fixing member 62 will be latched to the slot 641 of the lower joint 64 automatically to unfold and position the chair 4 back to its original position as shown in FIG. 16.

Figure 23:
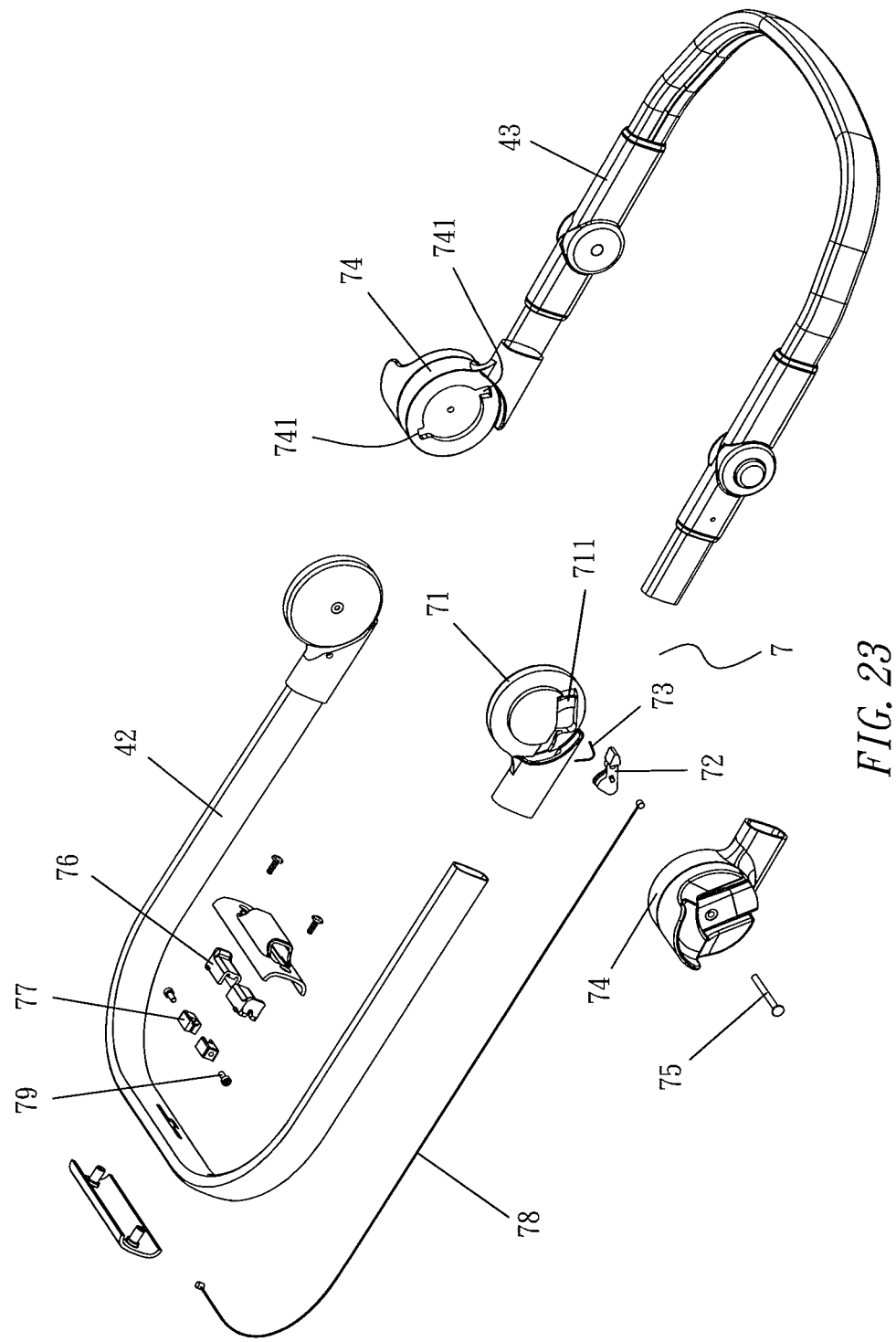
FIG. 23 is an exploded view of a chair folding joint in accordance with another preferred embodiment of the present invention.
Figure 24:
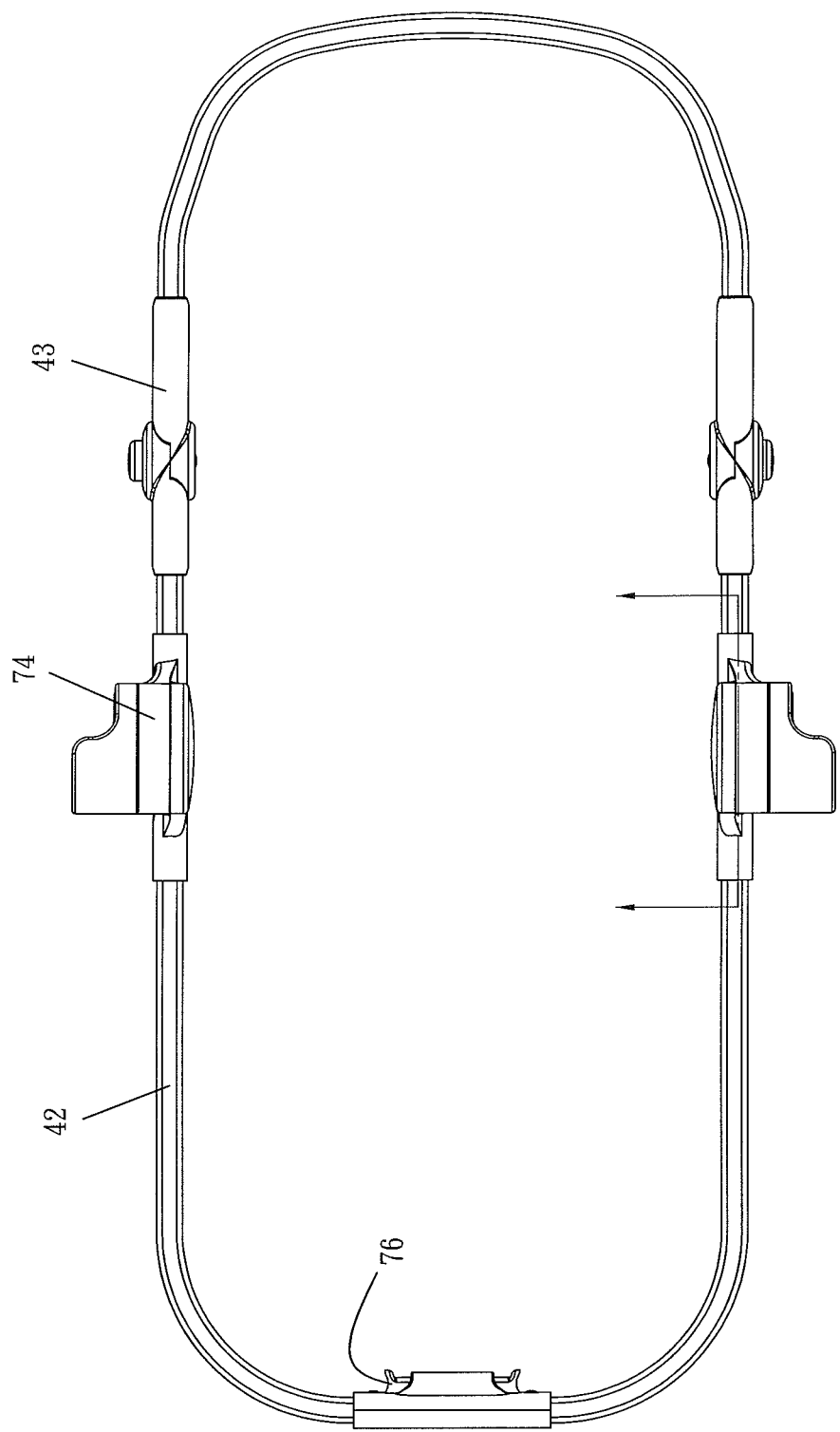
FIG. 24 is a schematic view of a chair folding joint in a locked state in accordance with another preferred embodiment of the present invention.
Figure 25:
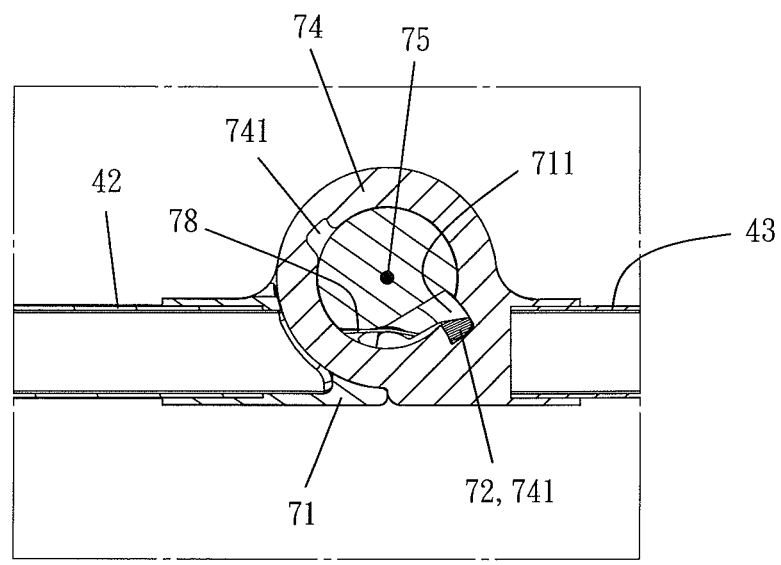
FIG. 25 is another schematic view of a chair folding joint in a locked state in accordance with another preferred embodiment of the present invention.

With reference to FIGS. 23 to 25 for a folding joint of another preferred embodiment of the present invention, the folding joint 7 comprises an upper joint 71 fixed to the bottom of the upper tube 42 of the chair 4 and having a notch 711 formed on an external side of the upper joint 71. A fixing member 72 is installed in the notch 711 through a spring 73. Thus, the fixing member 72 is always maintained at an outwardly rotated state. A lower joint 74 is fixed to an upper end of the lower tube 43 of the chair 4 and has two corresponding positioning slots 741 formed on internal sides of the lower joint 74. The upper and lower joints 71, 74 can be passed and coupled by a fixing element 75 (such as a rivet) to position the fixing member 72 therein. A press button 76 is installed on an external side at the middle of an upper end of the upper tube 42 of the chair 4 and has a slide member 77 installed at the bottom of the press button 76. A link element 78 (such as a steel wire) is installed in the upper tube 42 of the chair 4. The link element 78 has an end fixed to the fixing member 72 and another end fixed to the slide member 77. An adjusting screw 79 is screwed to the slide member 77, for adjusting the length of the link element 78.

Figure 26:
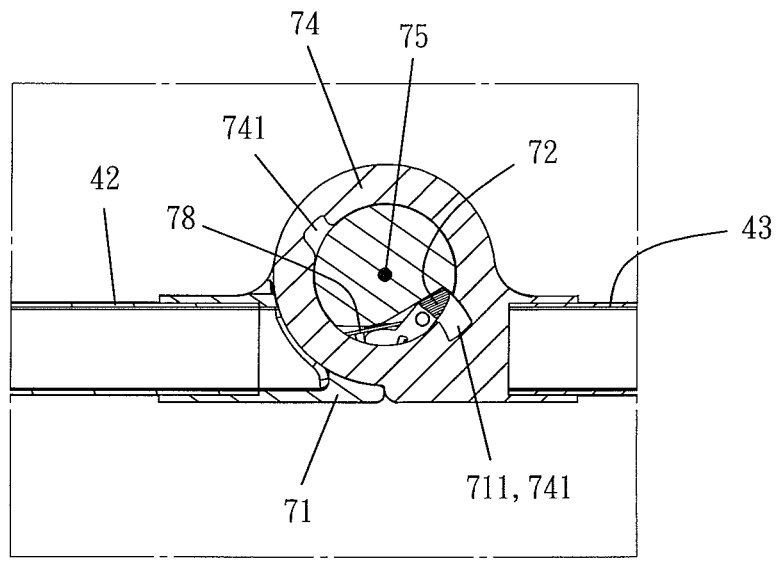
FIG. 26 is a schematic view of a chair folding joint in an unlocked state in accordance with another preferred embodiment of the present invention.
Figure 27:
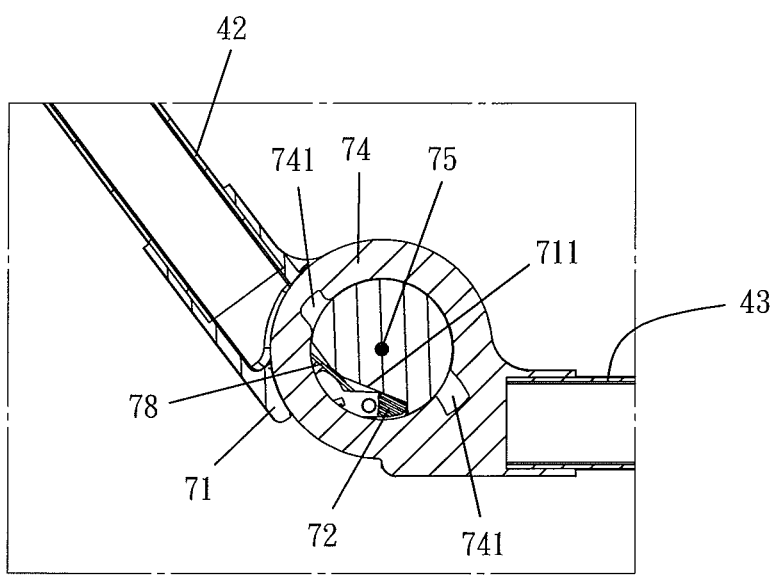
FIG. 27 is another schematic view of a chair folding joint in an unlocked state in accordance with another preferred embodiment of the present invention.

When the chair 4 is unfolded, the fixing member 72 is engaged with a positioning slot 741 of the lower joint 74. If the user wants to fold the baby stroller, the user simply presses the press button 76, such that the slide member 77 and the link element 78 pull the fixing member 72 to rotate, the fixing member 72 moves inwardly to detach its connection with the positioning slot 741 of the lower joint 74, and, then, the upper tube 42 of the chair 4 is turned to fold the chair 4 as shown in FIGS. 22, 26 and 27, to reduce the length (or height) into half. On the other hand, if the user does not apply forces to the press button 76, the fixing member 72 will be pushed to turn to its original position by the tension of the spring 73. Then, the upper tube 42 of the chair 4 is turned to latch the fixing member 72 into the positioning slot 741 of the lower joint 74 in order to unfold and position the chair 4 as shown in FIGS. 16, 24 and 25, to achieve the same effect of the aforementioned preferred embodiment.

In summation of the description above, the present invention achieves the expected objectives and effects.

What is claimed is:

1. A baby stroller comprising an independent stroller frame and a chair, wherein the independent stroller frame includes two upper tubes, two lower tubes, two rear wheel frames, and two joints, with the two rear wheel frames fixed to the two joints respectively, with the two upper tubes and the two lower tubes pivotally connected to the two joints about a joint axis respectively, with the two upper tubes and the two lower tubes pivotable between an unfolded position at a non-parallel angle to the two rear wheel frames and a folded position parallel to the two rear wheel frames, wherein each of the two joints comprises a rotatable base pivotally mounted to the joint about the joint axis, with the rotatable base being pivotal relative to the joint and the upper and lower tubes, wherein the chair is carried by the rotatable base of each of the two joints and pivotal therewith, wherein the rotatable base abuts the corresponding upper and lower tubes and positions the independent stroller frame automatically when the independent stroller frame and the chair are in the unfolded position and the chair is rotated together with the rotatable base when the independent stroller frame and the chair are folded, with the chair folded and positioned together with the independent stroller frame directly.

2. The baby stroller of claim 1, wherein the rotatable base has a positioning element installed on an external side at an upper end of the rotatable base abutting with the upper and lower tubes.

3. The baby stroller of claim 1, wherein each joint comprises:
   two joint covers secured by a fixing element;
   an upper link plate coupled to the upper tube of the stroller frame, with the upper link plate having a bump; and
   a lower link plate coupled to the lower tube of the stroller frame, with the lower link plate having a stop body, with the upper and lower link plates pivotal about the fixing element to pivotally connect the upper and lower tubes of the stroller frame, with the rotatable base pivotally mounted to the joint about the fixing element.

4. The baby stroller of claim 3, wherein the chair comprises a fabric seat, upper and lower tubes mounted onto the fabric seat, and a folding unit installed between the fabric seat and the upper and lower tubes of the chair.

5. The baby stroller of claim 4, wherein the folding unit comprises:
   an upper joint fixed to a bottom of the upper tube of the chair, with the upper joint having a notch formed on an external side of the upper joint;
   a fixing member installed into the notch of the upper joint through a spring;
   a press plate having a breach corresponding to the fixing member;
   a lower joint fixed at an upper end of the lower tube of the chair, with the lower joint having a positioning slot formed on an internal side of the lower joint and corresponding to the fixing member;
   a press button installed on an external side at the upper tube of the chair, with the press button having a slide member coupled to a bottom of the press button; and
   a link element installed in the upper tube of the chair, with the link element having an end fixed to the press plate and with a spring sheathed thereon, and having another end fixed to the slide member.

6. The baby stroller of claim 4, wherein the folding unit comprises:
   an upper joint fixed to a bottom of the upper tube of the chair, with the upper joint having a notch formed on an external side of the upper joint;
   a fixing member installed into the notch through a spring;
   a lower joint fixed at an upper end of the lower tube of the chair, with the lower joint having an positioning slot formed on an internal side of the lower joint and corresponding to the fixing member;
   a press button installed on an external side of the upper tube of the chair, with the press button having a slide member installed at a bottom of the press button; and
   a link element installed in the upper tube of the chair, with the link element having an end fixed to the fixing member and having another end fixed to the slide member.

7. The baby stroller of claim 1, wherein the rotatable base comprises a connector; and
   wherein the chair comprises a seat latch removably connecting the chair to the connector.

8. The baby stroller of claim 7, wherein the chair rotates with the rotatable base when the seat latch is removably connected to the connector.

9. The baby stroller of claim 7, wherein the rotatable base has a positioning element on an external side at an upper end of the rotatable base abutting with the upper and lower tubes.

10. The baby stroller of claim 7, wherein each joint comprises:
    two joint covers secured by a fixing element;
    an upper link plate coupled to the upper tube of the stroller frame, with the upper link plate having a bump; and
    a lower link plate coupled to the lower tube of the stroller frame, with the lower link plate having a stop body, with the upper and lower link plates pivotal about the fixing element to pivotally connect the upper and lower tubes of the stroller frame, with the rotatable base pivotally mounted to the joint about the fixing element.

11. The baby stroller of claim 10, wherein the rotatable base is rotatably connected to the joint by the fixing element.

12. The baby stroller of claim 11, wherein the fixing element is a bolt.

13. The baby stroller of claim 1, wherein the chair comprises a fabric seat, upper and lower tubes mounted onto the fabric seat, and a folding joint connected between the upper and lower tubes of the chair, wherein the folding joint retains the chair in a folded position wherein the upper tube of the chair is substantially parallel to the lower tube of the chair.

14. The baby stroller of claim 13, wherein the folding joint comprises:
    an upper joint fixed to a bottom of the upper tube of the chair, with the upper joint having a notch formed on an external side of the upper joint;
    a fixing member installed into the notch of the upper joint through a spring;
    a press plate having a breach corresponding to the fixing member;
    a lower joint fixed at an upper end of the lower tube of the chair, with the lower joint having a positioning slot formed on an internal side of the lower joint and corresponding to the fixing member;

a press button installed on an external side at the upper tube of the chair, with the press button having a slide member coupled to a bottom of the press button; and a link element installed in the upper tube of the chair, with the link element having an end fixed to the press plate with a spring sheathed thereon and having another end fixed to the slide member.

15. The baby stroller of claim 13, further comprising a foot rest folding joint.

16. The baby stroller of claim 13, wherein the folding joint comprises an upper joint and a lower joint positioning the upper and lower tubes in a substantially linear unfolded position.

\* \* \* \* \*